US007930580B2

United States Patent
Marchesini et al.

(10) Patent No.: US 7,930,580 B2
(45) Date of Patent: Apr. 19, 2011

(54) CONTROLLING TIMING DEPENDENCIES IN A MIXED SIGNAL SYSTEM-ON-A-CHIP (SOC)

(75) Inventors: Roberto Marchesini, Santa Monica, CA (US); Laurent Blanquart, Westlake Village, CA (US); Qianjiang Mao, Chino Hills, CA (US); John D. Wallner, Calabasas, CA (US)

(73) Assignee: AltaSens, Inc., Westlake Village, CA (US)

( * ) Notice: Subject to any disclaimer, the term of this patent is extended or adjusted under 35 U.S.C. 154(b) by 873 days.

(21) Appl. No.: 11/776,006

(22) Filed: Jul. 11, 2007

(65) Prior Publication Data

US 2009/0015301 A1 Jan. 15, 2009

(51) Int. Cl.
*G06F 1/00* (2006.01)
(52) U.S. Cl. ........................................................ 713/500
(58) Field of Classification Search .................... 348/505
See application file for complete search history.

(56) References Cited

U.S. PATENT DOCUMENTS

| | | | |
|---|---|---|---|
| 4,301,466 A | | 11/1981 | Lemoine et al. |
| 5,191,426 A | | 3/1993 | Kochi |
| 5,243,412 A | * | 9/1993 | Goukura et al. ............... 348/505 |
| 7,370,189 B2 | * | 5/2008 | Fischer et al. ...................... 713/2 |
| 2002/0145669 A1 | * | 10/2002 | Umeda et al. ............... 348/220.1 |
| 2004/0196272 A1 | * | 10/2004 | Yamashita et al. ............ 345/204 |
| 2005/0168602 A1 | * | 8/2005 | Sumi et al. ..................... 348/294 |

FOREIGN PATENT DOCUMENTS

EP 0 472 332 A 2/1992

OTHER PUBLICATIONS

International Search Report and Written Opinion for PCT Application No. PCT/ US2008/ 065635, mailed Sep. 9, 2008, 11 pages.

* cited by examiner

*Primary Examiner* — Thomas Lee
*Assistant Examiner* — Mohammed H Rehman
(74) *Attorney, Agent, or Firm* — Turocy & Watson, LLP

(57) ABSTRACT

The claimed subject matter provides systems and/or methods that facilitate controlling timing dependencies in a mixed signal circuit. Timing performance associated with a horizontal scanner and an analog to digital converter (ADC) can be monitored. Moreover, data related to the monitored timing performance can be leveraged to modify timing parameter(s) of clocks that coordinate operations of the horizontal scanner and the ADC (e.g., and/or digital component(s) included in the mixed signal circuit). For example, the clocks associated with the horizontal scanner and the ADC can be independently tuned to optimize mixed signal circuit performance.

20 Claims, 10 Drawing Sheets

CONTROLLING TIMING DEPENDENCIES IN A MIXED SIGNAL SYSTEM-ON-A-CHIP (SOC)

BACKGROUND

Integrated circuit design involves timing closure, which is the process by which designs can be modified to meet timing requirements. A typical design process for an Application Specific Integrated Circuit (ASIC) oftentimes includes logic design, floor planning, placement, layout, clock tree balancing, fixing setup times, and fixing hold times. The combination of clock tree balancing, fixing of setup times, and fixing of hold times is commonly referred to as timing closure. For a typical ASIC that includes digital components, timing closure can be effectuated with a high degree of accuracy since the behavior of clocks, storage elements (e.g., flip flops, latches, memories, . . . ), etc. can be accurately simulated.

Meanwhile, timing closure associated with mixed signal circuits is typically more difficult and less accurate as compared with digital circuits. Mixed signal design with digital component(s) and analog component(s) (e.g., image sensors) commonly cannot be simulated accurately to provide satisfactory timing closure. For example, a timing model can be yielded for digital logic (e.g., prior to fabrication), whereas an analog portion of a mixed signal ASIC typically cannot be characterized until the ASIC is fabricated and tested. Automation of circuit design associated with analog or mixed signal integrated circuits tends to be limited in comparison to digital circuit design. Further, testing functional operation of mixed signal integrated circuits typically is complex, expensive, and time consuming.

Recent technological advances have led to CMOS sensor imagers being leveraged by cameras, video systems, and the like. CMOS sensor imagers can include an integrated circuit with an array of pixel sensors, each of which can comprise a photodetector. Moreover, a CMOS sensor imager can be incorporated into a system-on-a-chip (SOC). As such, the SOC can integrate various components (e.g., analog, digital, . . . ) associated with imaging into a common integrated circuit. For instance, the SOC can include a microprocessor, microcontroller, or digital signal processor (DSP) core, memory, analog interfaces (e.g., analog to digital converters, digital to analog converters), and so forth. However, timing closure associated with such mixed signal SOC's typically is costly, difficult, and time consuming at best. Further, conventional techniques that address timing closure for mixed signal SOC's oftentimes inefficiently overcompensate or under compensate for timing lags within the SOC's.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate controlling timing dependencies in a mixed signal circuit. Timing performance associated with a horizontal scanner and an analog to digital converter (ADC) can be monitored. Moreover, data related to the monitored timing performance can be leveraged to modify timing parameter(s) of clocks that coordinate operations of the horizontal scanner and the ADC (e.g., and/or digital component(s) included in the mixed signal circuit). For example, the clocks associated with the horizontal scanner and the ADC can be independently tuned to yield optimized mixed signal circuit performance.

In accordance with various aspects of the claimed subject matter, a monitoring component and an optimization component can operate in conjunction to yield timing feedback control. For example, the monitoring component can evaluate a scan rate utilized by the horizontal scanner, a conversion rate employed by the ADC, length of time for effectuating scanning and/or conversion, amount of time for a signal to propagate from the horizontal scanner to the ADC, and so forth. The optimization component can thereafter leverage such monitored data to adjust parameter(s) (e.g. period, frequency, phase shift, . . . ) of clocks that coordinate timing of the horizontal scanner and the ADC. Moreover, parameter(s) of the clocks can be dynamically altered in real time, adjusted at startup, evaluated at a time of fabrication, and so forth.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
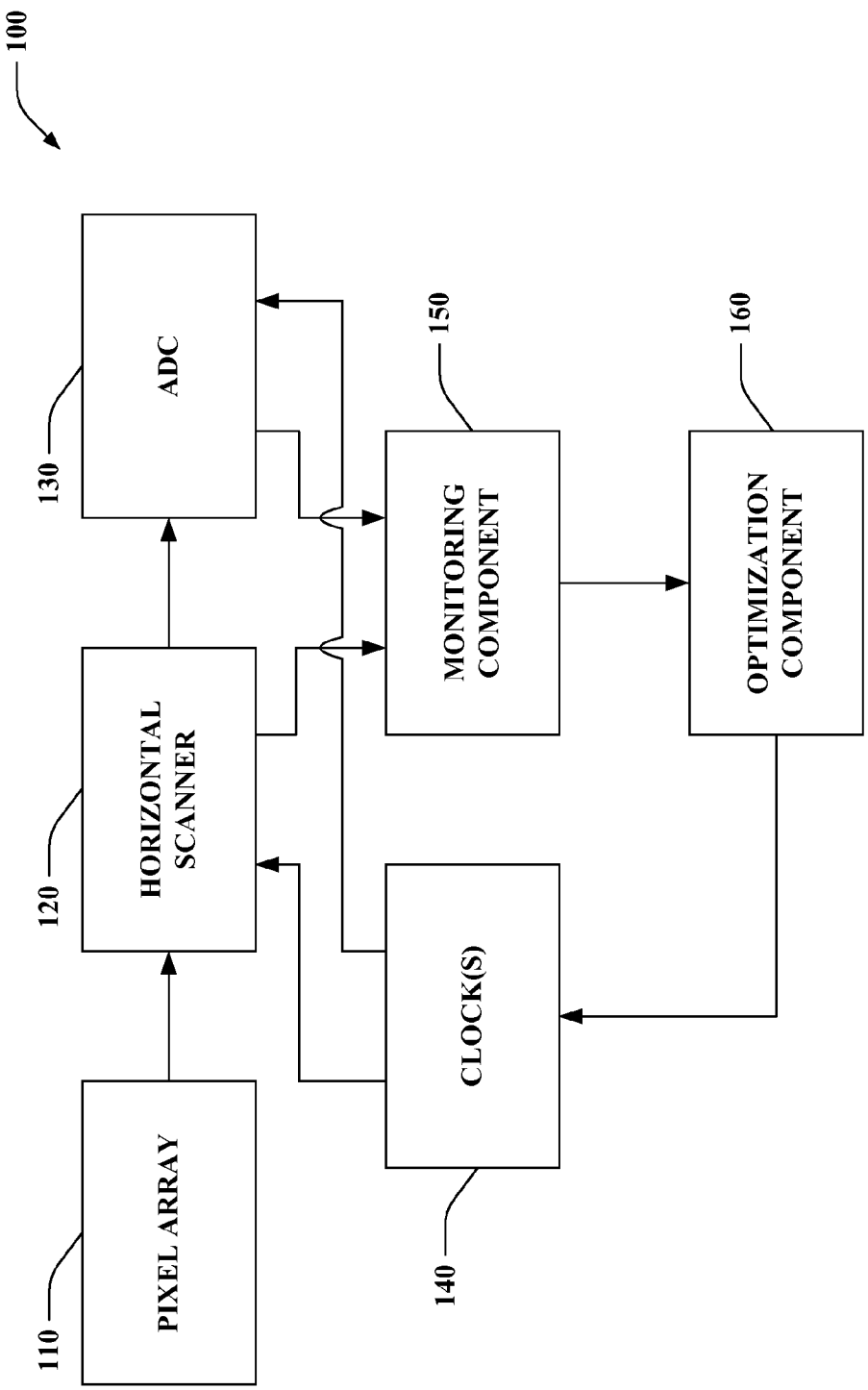
FIG. 1 illustrates a block diagram of an example system that configures independent clock trees within a mixed signal ASIC.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

With reference to FIG. 1, illustrated is a system 100 that configures independent clock trees within a mixed signal ASIC. The system 100 enables timing closure to be effectuated for a mixed signal circuit that includes uncharacterized analog components (e.g., which oftentimes are unable to be accurately simulated to yield a timing model prior to fabrication). Moreover, the system 100 can perform post-fabrication configuration of the independent clock trees for analog and digital portions of the mixed signal ASIC. Accordingly, the system 100 can coordinate clocks associated with disparate analog and digital components to account for time lags associated with signal propagation, performing operations, processing, and so forth. The system 100 can be associated with a CMOS sensor imager utilized in connection with a camcorder, digital camera, microscope, video system, and the like.

The system 100 can include a pixel array 110. The pixel array 110 can be a two-dimensional array and can include any number of rows and columns of pixel sensors. For example, the pixel array 110 can include M rows and N columns of pixels, where M and N can be substantially any integers. Further, each of the pixel sensors in the pixel array 110 can include a photodetector. Moreover, signals obtained by the pixel array 110 can be processed on a column by column basis. Accordingly, a particular row of the pixel array 110 can be selected for processing by a horizontal scanner 120. The horizontal scanner 120 can generate analog signals (e.g., associated with the pixel sensors at each column within the selected row) that can be provided to an analog to digital converter (ADC) 130. The ADC 130 can convert the analog signals into digital values, which can be further processed (e.g., via various digital component(s) (not shown)).

The horizontal scanner 120 and the ADC 130 can effectuate respective operations with timing provided by one or more clock(s) 140. For example, the horizontal scanner 120 and the ADC 130 can each obtain timing information from disparate, respective clocks 140. Alternatively, it is contemplated that the horizontal scanner 120 and the ADC 130 can leverage a common clock 140. Further, the clock(s) 140 can coordinate timing for digital components associated with the mixed signal ASIC.

Further, a monitoring component 150 can track performance of the horizontal scanner 120 and the ADC 130. For example, the monitoring component 150 can examine a scan rate with which the horizontal scanner 120 processes signals obtained by the pixel array 110. Additionally, the monitoring component 150 can observe a rate at which the ADC 130 performs analog to digital conversions. Further, the monitoring component 150 can evaluate lengths of time associated with scanning by the horizontal scanner 120, analog to digital processing by the ADC 130, signal propagation between the horizontal scanner 120 and the ADC 130, and the like.

Moreover, an optimization component 160 can leverage the performance data obtained by the monitoring component 150 to control operation of the clock(s) 140. The optimization component 160, for instance, can alter periodicity of one or more clock(s) 140. According to a further illustration, the optimization component 160 can shift a phase between a plurality of clock(s) 140. Following this illustration, the optimization component 160 can evaluate an expected delay between the horizontal scanner 120 and the ADC 130 based upon data yielded by the monitoring component 150; thereafter, the optimization component 160 can adjust timing of the clock(s) 140 to account for the determined, expected delay. It is contemplated that the optimization component 160 can independently tune the clock(s) 140 utilized by the horizontal scanner 120 and the ADC 130.

The monitoring component 150 and the optimization component 160 can provide feedback control to enable adjusting clock timing within the mixed signal system 100. By employing the monitoring component 150 and the optimization component 160, any parameters associated with the clock(s) 140 can be tuned to optimize performance of the system 100. The parameters, for example, can relate to period, frequency, phase, and the like, and the parameters can be independently altered for each of the clock(s) 140. Moreover, the timing parameters can be dynamically adjusted in real time during operation, altered at startup (e.g., determined as part of initialization of the system 100), set after fabrication, etc. by the optimization component 160 (e.g., based upon observations yielded by the monitoring component 150).

Figure 2:
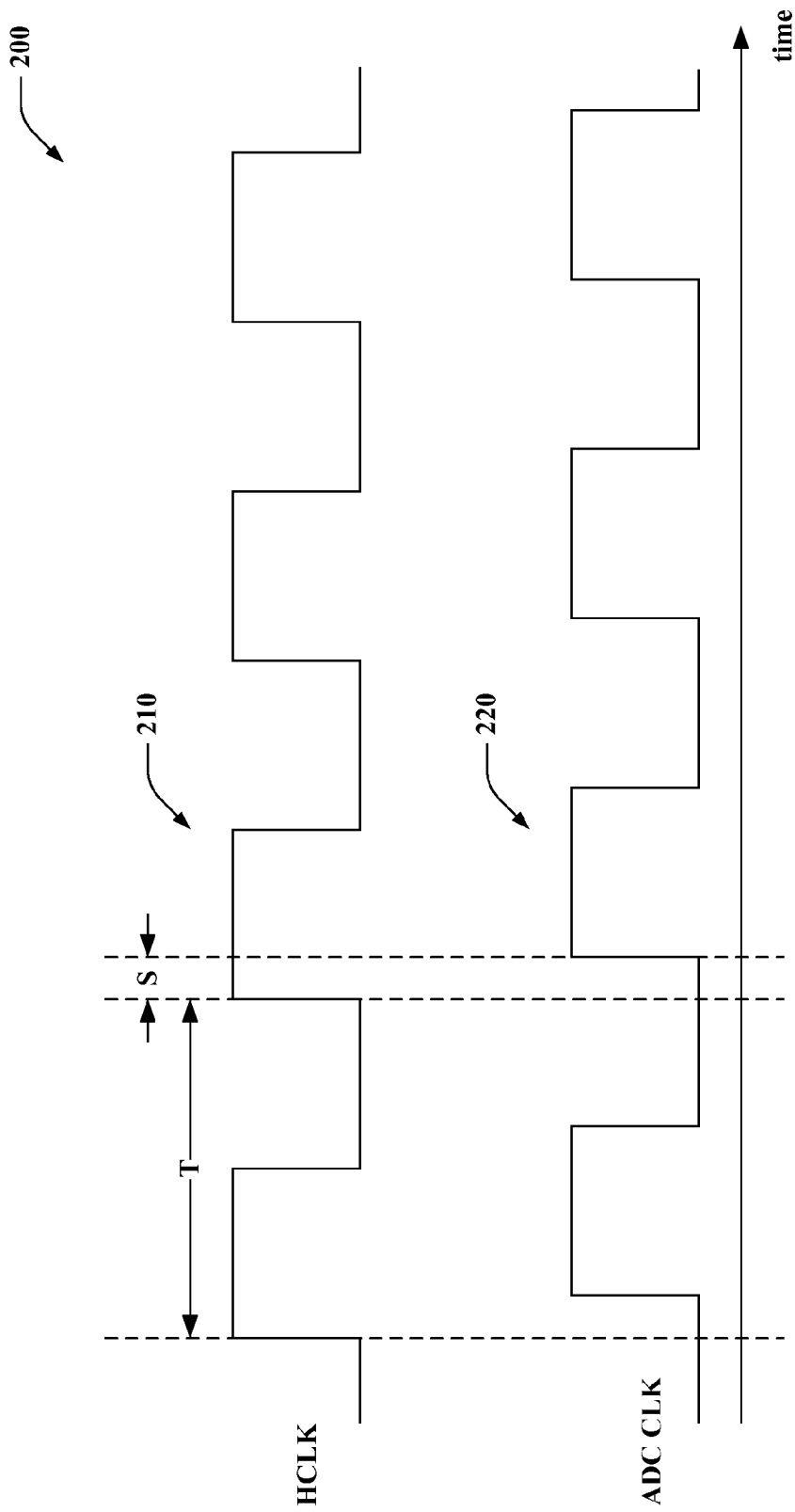
FIG. 2 illustrates an example timing diagram that depicts timing parameters that can be independently controlled to optimize performance of a mixed signal SOC.

With reference to FIG. 2, illustrated is an example timing diagram 200 that depicts timing parameters that can be independently controlled to optimize performance of a mixed signal SOC. It is to be appreciated that the timing diagram 200 is provided as an example, and the claimed subject matter is not so limited. The timing diagram 200 includes a horizontal scan clock (HCLK) 210 and an ADC clock (ADC CLK) 220. The HCLK 210 and the ADC CLK 220 can be independently altered (e.g., by the monitoring component 150 and the optimization component 160 of FIG. 1). For example, the optimization component 160 can change (e.g. lengthen, shorten, . . . ) a period (T) associated with the HCLK 210 and/or the ADC CLK 220. Further, the optimization component 160 can fine tune a phase shift (S) (e.g., lag) between the HCLK 210 and the ADC CLK 220. By way of illustration, the optimization component 160 can control a programmable delay to adjust the phase shift between the HCLK 210 and the ADC CLK 220. Thus, in comparison to conventional techniques that oftentimes employ a static overestimated or underestimated lag between the HCLK 210 and the ADC CLK 220 (e.g. manually preset margin), the feedback control provided by the monitoring component 150 and the optimization component 160 can automatically tailor the timing parameters (e.g. period, frequency, phase shift, . . . ) of the HCLK 210 and the ADC CLK 220 with a high degree of granularity to yield improved performance (e.g., enhance speed of processing, mitigate noise, allow for operating upon a maximum received signal at the ADC 130, . . . ).

Figure 3:
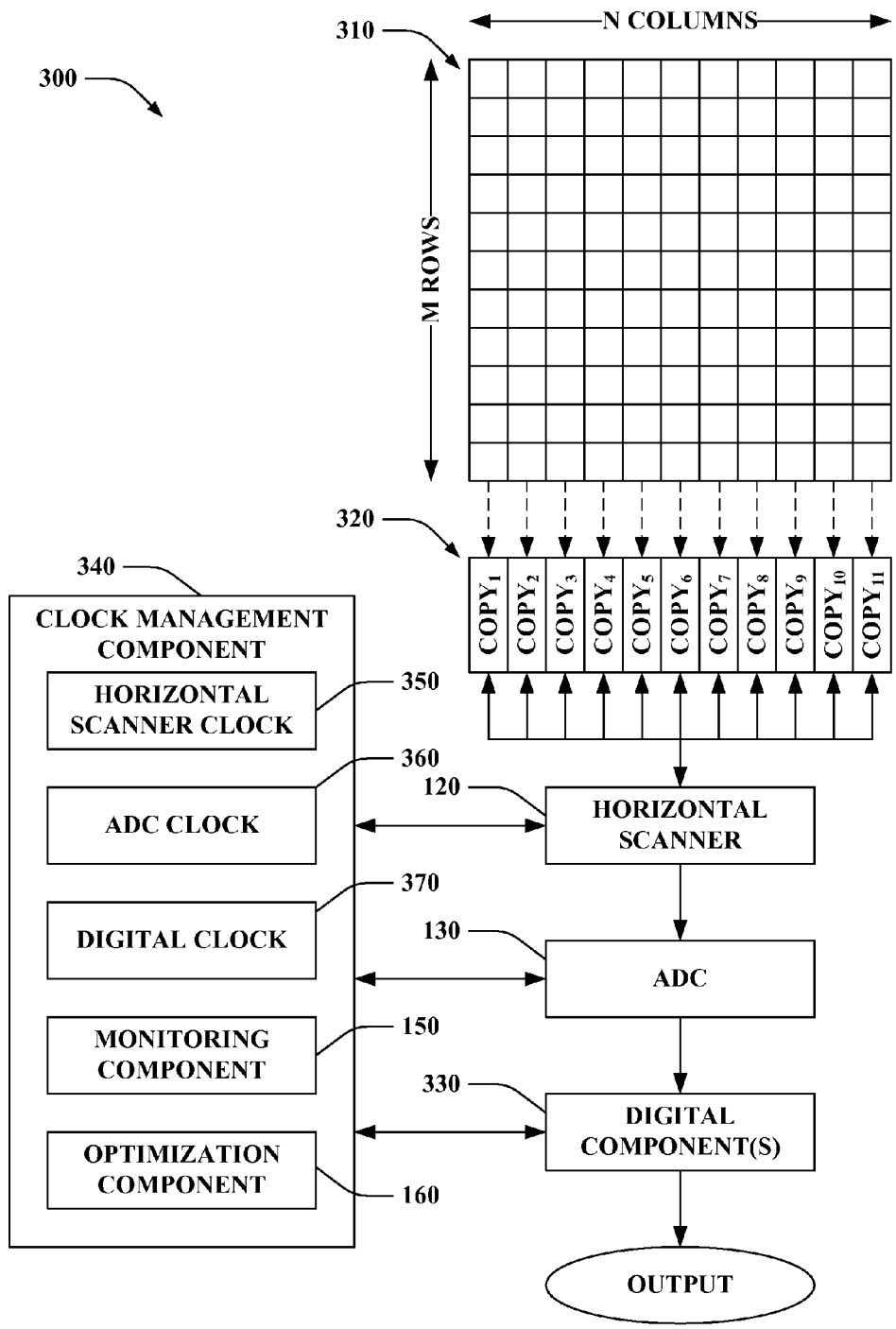
FIG. 3 illustrates a block diagram of an example system that enables controlling timing dependencies in a mixed signal SOC.

With reference to FIG. 3, illustrated is a system 300 that enables controlling timing dependencies in a mixed signal SOC. The system 300 includes a pixel array 310 that can include M rows and N columns, where M and N can be any integers. Each pixel in the pixel array 310 can comprise a photodetector (e.g., a photodiode). Signals obtained by the pixel array 310 can be processed on a column by column basis; thus, a particular row of pixels from the pixel array 310 can be selected to be read. Further, the particular row of pixels chosen to be read at a particular time can be copied (e.g., transferred to corresponding pixel copies 320). Thus, the system 300 can include N pixel copies 320, where each of the pixel copies 320 corresponds to a respective column from the pixel array 310. Although eleven pixel copies 320 are depicted, it is to be appreciated that substantially any number of pixel copies 320 can be employed in connection with the system 300. Moreover, the pixel copies 320 can include analog information.

The system 300 can also include the horizontal scanner 120 that can process data from each of the pixel copies 320. The horizontal scanner 120 can scan each of the pixel copies 320 to yield the analog data associated with each of the pixel copies 320. After scanning the pixel copies 320, the analog data can be provided to the ADC 130. The ADC 130 can digitize the analog data to provide digital signals in response. One or more digital component(s) 330 can operate upon the digital signals yielded by the ADC 130 to generate an output. It is to be appreciated that substantially any type of operations can be effectuated by the digital component(s) 330.

The horizontal scanner 120, the ADC 130, and the digital component(s) 330 can coordinate respective operations based upon timing information obtained from a clock management component 340. The clock management component 340 can dynamically adjust the timing to optimize performance of the system 300. For example, the clock management component 340 can analyze feedback from the horizontal scanner 120, the ADC 130, and the digital component(s) 330 to tune the timing employed by such components.

The clock management component 340 can include the monitoring component 150 and the optimization component 160 as described above. For example, the monitoring component 150 can gather information related to a scan rate of the horizontal scanner 120, a conversion rate by the ADC 130, etc. According to an illustration, the monitoring component 150 can track performance of the horizontal scanner 120, ADC 130, and/or the digital component(s) 330 at various times (e.g. since operating parameters such as the scan rate or conversion rate can change due to fluctuations in temperature, device age, humidity, settings, . . . ); however, it is to be appreciated that the claimed subject matter is not so limited.

The optimization component 160 can employ the information obtained via the monitoring component 150 to tune the timing within the system 300.

Pursuant to another example, the system 300 can utilize a known test pattern to optimize timing. Following this example, the known test pattern can be provided to the pixel array 310 and thereafter processed by the horizontal scanner 120, the ADC 130, and/or the digital component(s) 330 while the monitoring component 150 can review the processing. Moreover, the optimization component 160 can alter timing provided by the horizontal scanner clock 350, the ADC clock 360, and/or the digital clock 370 automatically based upon observations yielded by the monitoring component 150 to enhance performance of the system 300.

Further, the clock management component 340 can include a horizontal scanner clock 350, an ADC clock 360 and a digital clock 370 that can yield timing information for the horizontal scanner 120, the ADC 130, and the digital component(s) 330, respectively. The horizontal scanner clock 350, the ADC clock 360, and the digital clock 370 can be driven by the optimization component 160; thus, the optimization component 160 can independently tune one or more of the clocks 350-370 (e.g., set or reset periodicity, frequency, phase, etc. associated with one or more of the clocks 350-370). By employing the monitoring component 150 and the optimization component 160, the period, phase, frequency, etc. of one or more of the clocks 350-370 can be dynamically changed until converging upon the optimal settings (e.g., optimize a lag between scanning by the horizontal scanner 120 and digitizing by the ADC 130, . . . ). By way of further illustration, scan rates, conversion rates, propagation times, etc. analyzed by the monitoring component 150 can vary over time, and thus, the optimization component 160 can enable dynamically adjusting the timing for one or more of the clocks 350-370. Moreover, the monitoring component 150 and the optimization component 160 enable post-fabrication configuring of independent clock trees for analog and digital portions of the mixed signal SOC. For example, the configuration of the independent clock trees can be effectuated by way of using fine phase delay tuners such as programmable delay lines and/or programmable delay-locked loop (DLL) delays.

The clock management component 340, for instance, can provide a tunable delay for the clocks 350-370 to enable synchronizing a plurality of analog operations. For example, the optimization component 160 can facilitate allowing a line driver to settle prior to performing an ADC sampling. According to another illustration, the optimization component 160 can coarsely and finely tune a period, delay, etc. associated with one or more of the clocks 350-370. Following this illustration, coarse tuning can be effectuated by shifting the horizontal scanner clock 350 by a step of one-half a clock cycle (e.g., one-half a 75 MHz clock cycle). Further, a 1.8 V analog delay element covering a range of 6.5 ns can enable fine tuning such that a short delay and use of 1.8 V transistors can reduce mismatch. It is to be appreciated, however, that the claimed subject matter is not limited to the aforementioned illustration.

Figure 4:
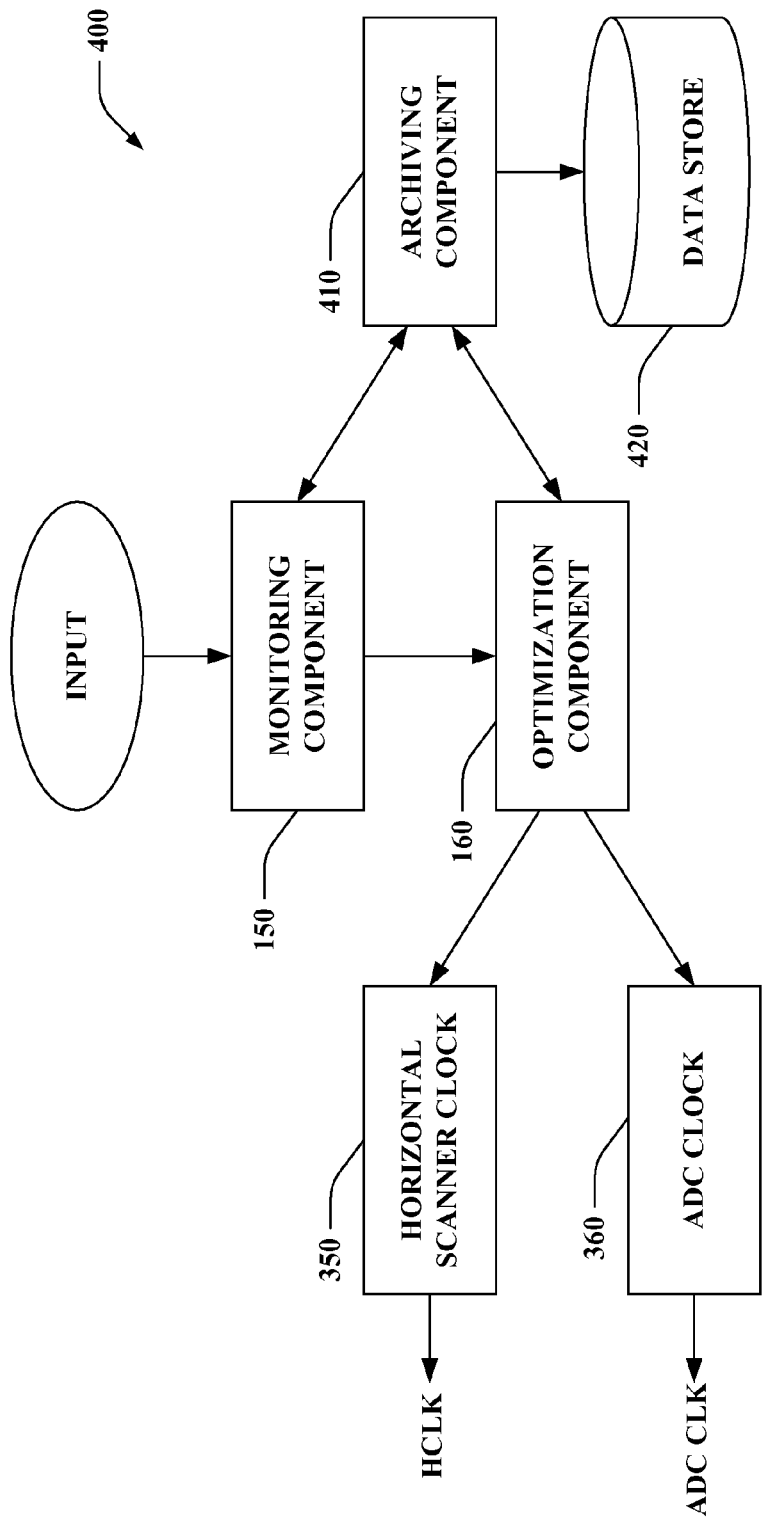
FIG. 4 illustrates a block diagram of an example system that enables retaining and/or employing historical performance data in connection with controlling timing dependencies in a mixed signal SOC.

Now turning to FIG. 4, illustrated is a system 400 that enables retaining and/or employing historical performance data in connection with controlling timing dependencies in a mixed signal SOC. The system 400 includes the monitoring component 150 that can obtain input data. For example, the monitoring component 150 can monitor scanning rate(s), analog to digital conversion rate(s), and the like. Moreover, the optimization component 160 can utilize data captured by the monitoring component 150 to control the horizontal scanner clock 350 and the ADC clock 360. For instance, the horizontal scanner clock 350 and the ADC clock 360 can be independently controlled by the optimization component 160 to yield the HCLK and ADC CLK, respectively. Further, the HCLK and the ADC CLK can be employed to coordinate performance of operations by a horizontal scanner and an ADC (e.g., the horizontal scanner 120 and the ADC 130).

The system 400 can additionally include an archiving component 410 and a data store 420. The archiving component 410 can enable retaining any type of data in the data store 420. According to an illustration, the archiving component 410 can facilitate storing monitored feedback data obtained by the monitoring component 150. Moreover, the archiving component 410 can enable retaining settings provided to the horizontal scanner clock 350 and/or the ADC clock 360 from the optimization component 160; thus, pursuant to this example, the archiving component 410 can store information related to periodicity, frequency, phase, etc. of the HCLK and/or ADC CLK in the data store 420. The optimization component 160 can further leverage the data retained in the data store 420 to control the timing associated with the horizontal scanner clock 350 and the ADC clock 360.

According to another example, the data store 420 can retain default timing data for the horizontal scanner clock 350 and/or the ADC clock 360. For instance, depending upon settings of a camera employing the system 400 (e.g., black and white, color, day or night, amount of available light, . . . ), the data store 420 can include a lookup table with initial timing settings for the horizontal scanner clock 350 and/or the ADC clock 360. Thereafter, based upon real time feedback control provided by the monitoring component 150 and the optimization component 160, adjustments from the initial timing settings can be effectuated.

The data store 420 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 420 of the subject systems and methods is intended to comprise, without being limited to, these and any other suitable types of memory. In addition, it is to be appreciated that the data store 420 can be a server, a database, a hard drive, and the like.

Figure 5:
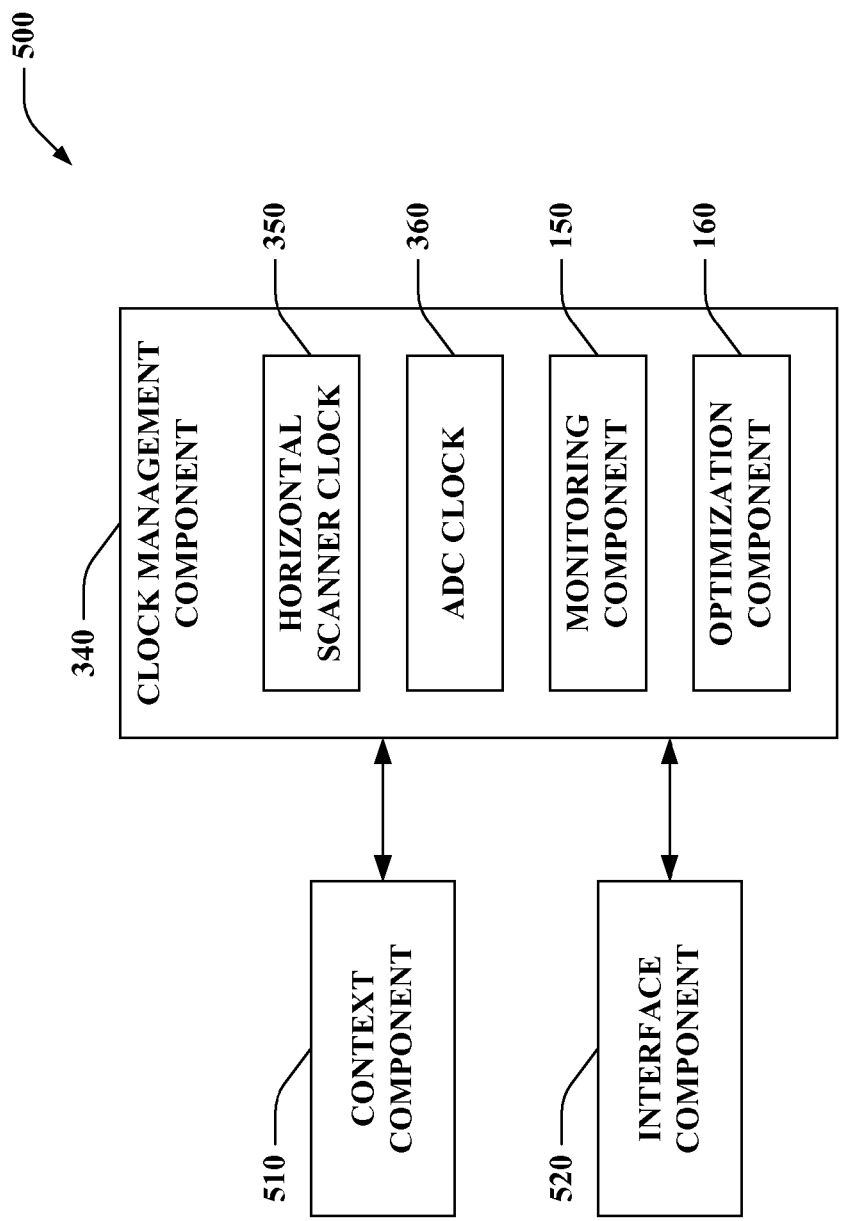
FIG. 5 illustrates a block diagram of an example system that coordinates timing between analog and digital components associated with a CMOS sensor imager.

Referring to FIG. 5, illustrated is a system 500 that coordinates timing between analog and digital components associated with a CMOS sensor imager. The system 500 includes the clock management component 340 that controls timing of various analog and/or digital components. The clock management component 340 can further include the monitoring component 150, the optimization component 160, the horizontal scanner clock 350, and the ADC clock 360. In addition to evaluating feedback data to optimize timing, the clock management component 340 can leverage input data from a context component 510 and/or an interface component 520 to alter timing generated by the horizontal scanner clock 350 and/or the ADC clock 360 (and/or the digital clock 370 (not shown)).

The context component 510 can analyze contextual data associated with a CMOS sensor imager, and the contextual data can be provided to the clock management component 340 to enable adjusting the timing. For example, the context component 510 can decipher settings associated with the CMOS sensor imager such as whether a black and white or color mode is being employed, a resolution, an amount of zoom, an amount of signal amplification (e.g. analog, digital, . . . ), one or more of the eighteen HD timing standards defined by the Advanced Television System Committee (ATSC) is being used, legacy NTSC or PAL timing has been selected, and so forth. Moreover, the context component 510 can evaluate characteristics related to an environment in which the system 500 is being employed, such as single-sensor or three-sensor cameras driving single or multiple video data paths; thereafter, these characteristics can be provided by the context component 510 to the clock management component 340. By way of illustration, the context component 510 can determine whether the system 500 is being utilized during the day or at night, a temperature or a humidity level, an amount of available light, a speed at which a subject being recorded is moving, whether captured video is being stored and/or transmitted (e.g., streamed, incorporated into a multimedia message or email, . . . ), and so forth.

Moreover, the interface component 520 can enable a user to adjust timing associated with the horizontal scanner clock 350 and/or the ADC clock 360. According to an example, the interface component 520 can provide various types of user interfaces to facilitate interaction between a user and the clock management component 340. As depicted, the interface component 520 is a separate entity that can be utilized with the clock management component 340. However, it is to be appreciated that the interface component 520 can be incorporated into the clock management component 340 and/or a stand-alone unit. The interface component 520 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent to entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 6:
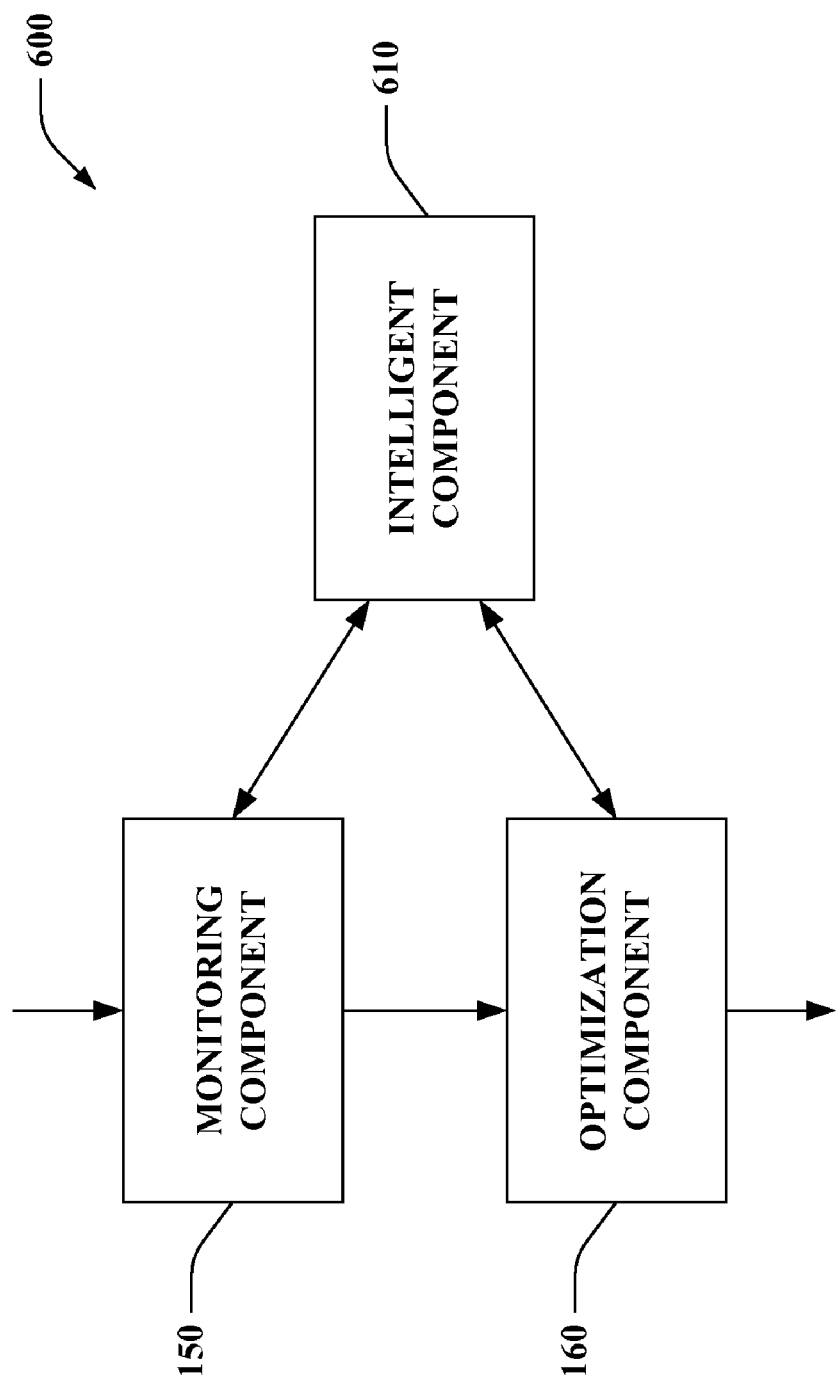
FIG. 6 illustrates a block diagram of an example system that modifies timing dependencies in a mixed signal SOC based upon an inference.

Turning to FIG. 6, illustrated is a system 600 that modifies timing dependencies in a mixed signal SOC based upon an inference. The system 600 can include the monitoring component 150 and the optimization component 160, which can be substantially similar to the respective, aforementioned descriptions. The system 600 can further include an intelligent component 610 that can be utilized by the monitoring component 150 and/or the optimization component 160 to reason about whether observed timing feedback warrants timing dependency alteration. Pursuant to another example, the optimization component 160 can leverage the intelligent component 610 to infer how changes to the timing utilized by various analog and digital components will impact performance.

It is to be understood that the intelligent component 610 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
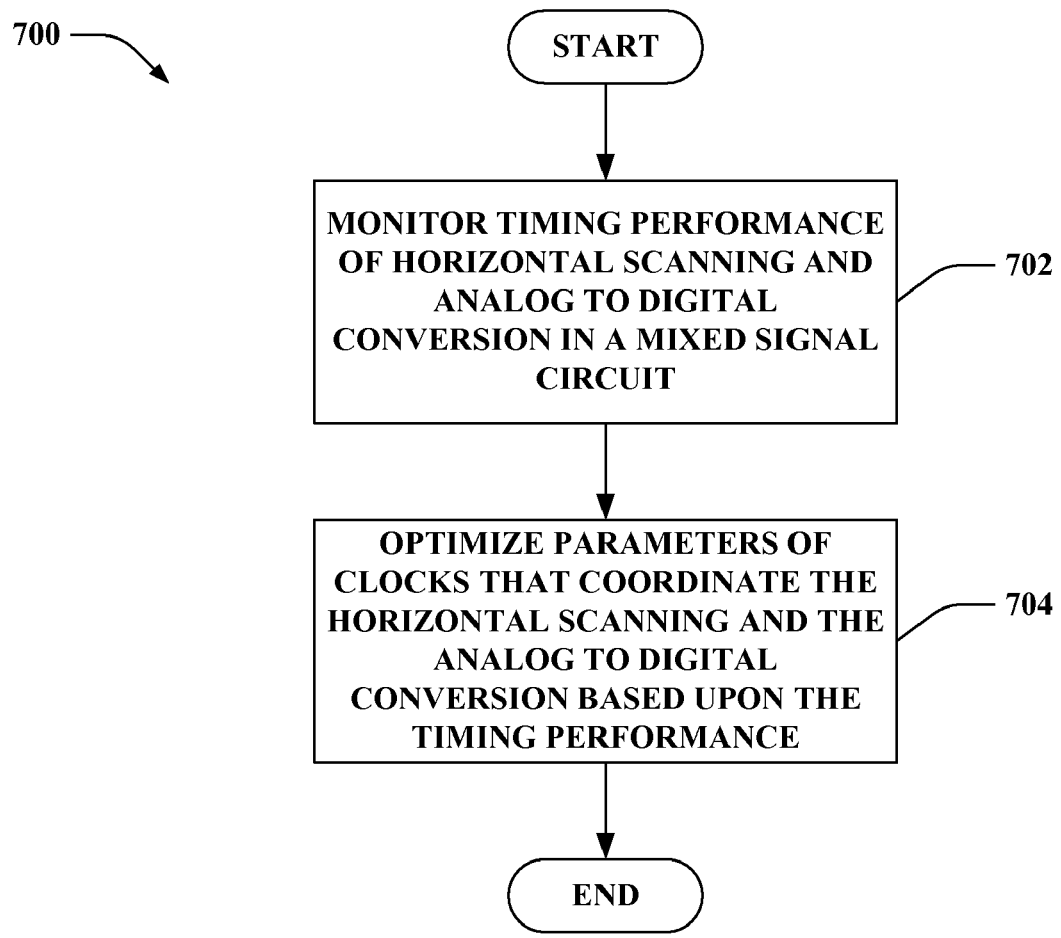
FIG. 7 illustrates an example methodology that facilitates controlling timing dependencies.
Figure 8:
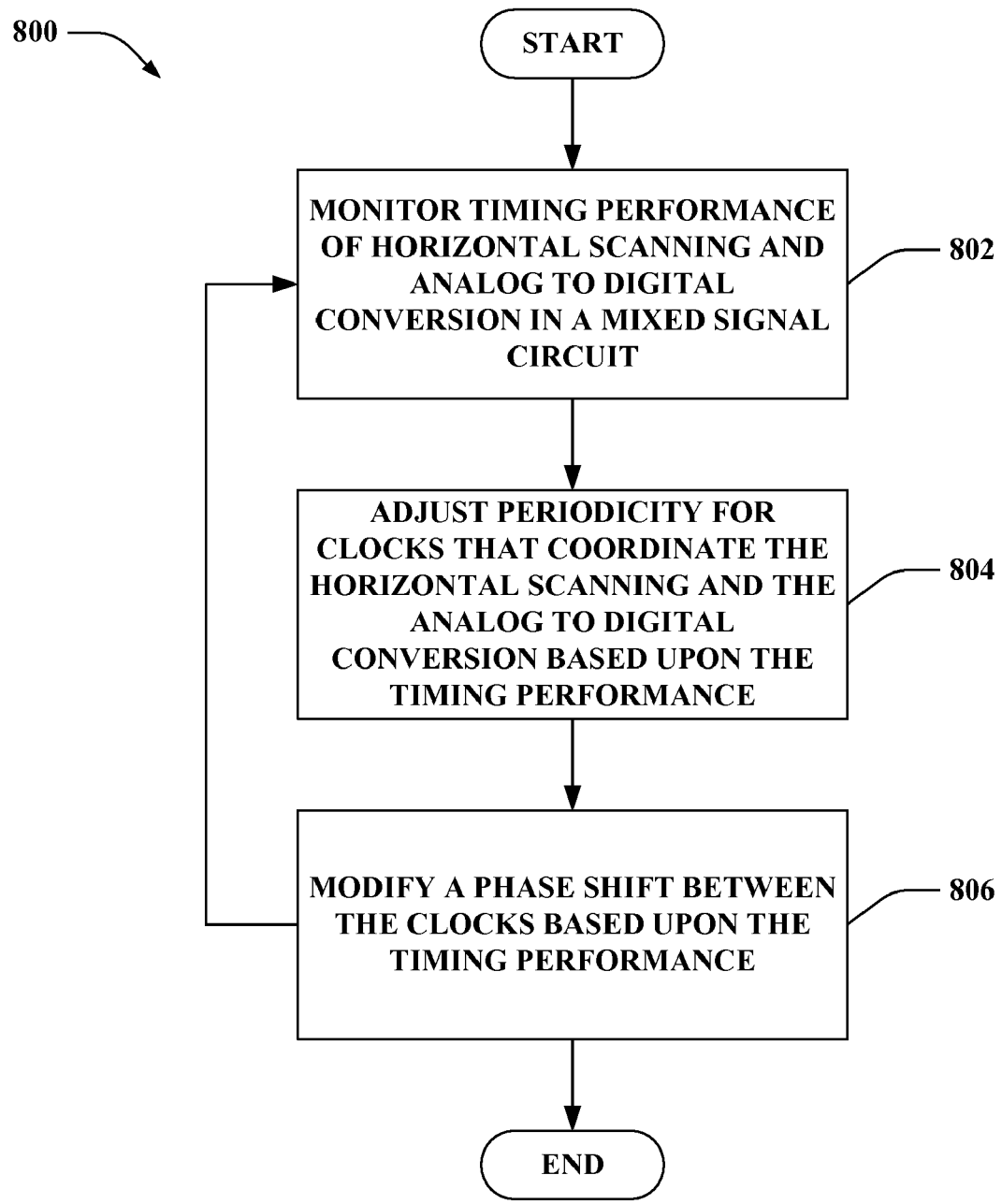
FIG. 8 illustrates an example methodology that facilitates dynamically altering timing parameters within a mixed signal circuit.

FIGS. 7-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 7, illustrated is a methodology 700 that facilitates controlling timing dependencies. At 702, timing performance of horizontal scanning and analog to digital conversion can be monitored in a mixed signal circuit. For example, the monitored timing performance can relate to horizontal scanning rate, analog to digital conversion rate, signal propagation time, and so forth. At 704, parameters of clocks that coordinate the horizontal scanning and the analog to digital conversion can be optimized based upon the timing performance. By way of illustration, clocks utilized to control horizontal scanning and analog to digital conversion can be fine tuned as a function of feedback information (e.g., the monitored timing performance) to enhance overall performance. For instance, periodicity, frequency, phase shift, etc. of each of the clock signals can be independently adjusted. Moreover, such adjustments can be effectuated dynamically in real time, as part of a start up sequence, as part of post-fabrication calibration, and so forth.

Now referring to FIG. 8, illustrated is a methodology 800 that facilitates dynamically altering timing parameters within a mixed signal circuit. At 802, timing performance of horizontal scanning and analog to digital conversion can be monitored in a mixed signal circuit. At 804, periodicity for clocks that coordinate the horizontal scanning and the analog to digital conversion can be adjusted based upon the timing performance. For example, horizontal scanning and analog to digital conversion can each be associated with a respective clock that coordinates such operations. At 806, a phase shift between the clocks can be modified based upon the timing performance. Accordingly, the phase shift can be selected to optimize an amount of lag (e.g., mitigate overestimation or underestimation of the lag) between horizontal scanning and analog to digital conversion. The methodology 800 can thereafter return to 802 to enable dynamically adjusting the periodicity and the phase shift over time (e.g., to account for fluctuations associated with analog components yielded by changes in temperature, humidity, age, . . . ).

Figure 9:
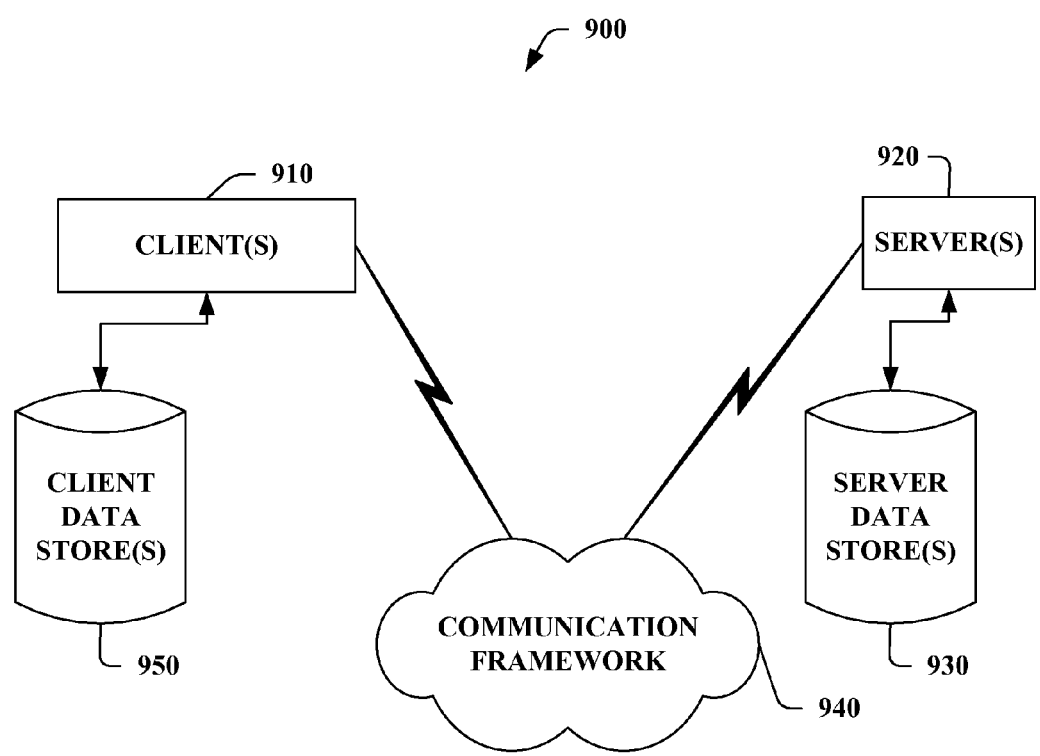
FIG. 9 illustrates an example networking environment, wherein the novel aspects of the claimed subject matter can be employed.
Figure 10:
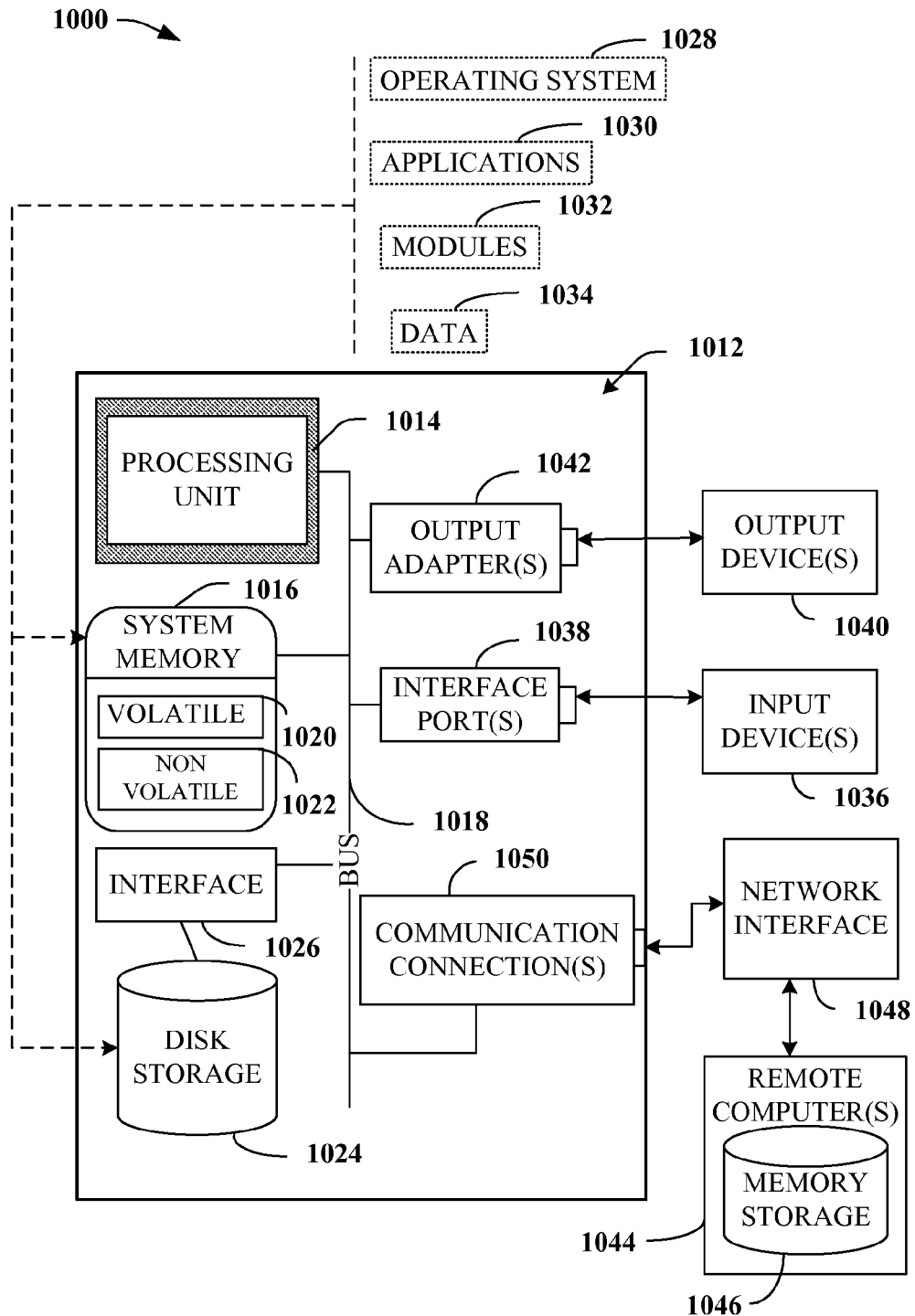
FIG. 10 illustrates an example operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For instance, FIGS. 9-10 set forth a suitable computing environment that can be employed in connection with controlling timing dependencies in a mixed signal circuit. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that configures independent clocks within a mixed signal circuit, comprising:
   a monitoring component that tracks performance of a horizontal scanner and an analog to digital converter (ADC), the horizontal scanner and the ADC comprised in the mixed signal circuit; and
   an optimization component that adjusts one or more parameters of at least one of a horizontal scanner clock or an ADC clock, the horizontal scanner clock and the ADC clock coordinate scanning pixels at columns within a selected row of a pixel array by the horizontal scanner to generate analog signals and conversion of the analog signals to digital values by the ADC based upon performance data yielded by the monitoring component.

2. The system of claim 1, the monitoring component examines at least one of a scan rate associated with the horizontal scanner, a conversion rate associated with the ADC, a length of time associated with scanning by the horizontal scanner, an amount of time for analog to digital processing by the ADC, or a length of time related to signal propagation from the horizontal scanner to the ADC.

3. The system of claim 1, the optimization component independently tunes the horizontal scanner clock and the ADC clock.

4. The system of claim 1, the optimization component adjusts timing of at least one of the horizontal scanner clock and the ADC clock to account for an expected delay.

5. The system of claim 1, wherein the one or more parameters includes at least one of period, frequency, or phase shift.

6. The system of claim 1, the optimization component dynamically adjusts the one or more parameters during operation of the horizontal scanner and the ADC.

7. The system of claim 1, the optimization component dynamically adjusts the one or more parameters in real time to account for performance fluctuation associated with an analog device comprised in the mixed signal circuit.

8. The system of claim 1, the optimization component adjusts the one or more parameters as part of an initialization sequence.

9. The system of claim 1, the optimization component coarsely and finely adjusts the one or more parameters.

10. The system of claim 9, the optimization component coarsely adjusts the one or more parameters by shifting the horizontal scanner clock by a step of one-half a clock cycle and finely adjusts the one or more parameters by shifting the horizontal scanner clock with an analog delay element having a range up to one-half a clock cycle.

11. The system of claim 1, the optimization component modifies periodicity of the horizontal scanner clock and the ADC clock and a lag between the horizontal scanner clock and the ADC clock.

12. The system of claim 1, further comprising an archiving component that enables retaining at least one of monitored feedback data or clock settings for utilization by the optimization component.

13. The system of claim 1, further comprising a context component that analyzes contextual data associated with a CMOS sensor imager, the contextual data being utilized by the optimization component to enable adjusting the one or more parameters.

14. A method that facilitates controlling timing dependencies, comprising:
   monitoring timing performance of horizontal scanning by a horizontal scanner and analog to digital conversion by an analog to digital converter (ADC), the horizontal scanner and the ADC comprised in a mixed signal circuit; and
   optimizing parameters of clocks that coordinate the horizontal scanning and the analog to digital conversion in the mixed signal circuit based upon the timing performance.

15. The method of claim 14, further comprising:
   adjusting periodicity for the clocks based upon the timing performance; and
   modifying a phase shift between the clocks based upon the timing performance.

16. The method of claim 15, further comprising dynamically adjusting the periodicity and the phase shift in real time to account for fluctuations associated with analog components comprised in the mixed signal circuit.

17. The method of claim 14, wherein the timing performance relates to at least one of a horizontal scanning rate, an analog to digital conversion rate, or a signal propagation time.

18. The method of claim 14, further comprising independently adjusting the clocks.

19. The method of claim 14, further comprising employing a known test pattern to optimize the parameters of the clocks.

20. A system that facilitates dynamically altering timing parameters within a mixed signal circuit, comprising:
   means for monitoring a horizontal scanner and an analog to digital converter (ADC), the horizontal scanner and the ADC comprised in the mixed signal circuit; and
   means for optimizing timing of clocks utilized to control the horizontal scanner and the analog to digital converter in the mixed signal circuit based upon data observed during monitoring.

* * * * *